J. A. SWINEHART.
SINGLE TUBE PNEUMATIC TIRE.
APPLICATION FILED FEB. 19, 1906.
909,962.
Patented Jan. 19, 1909.
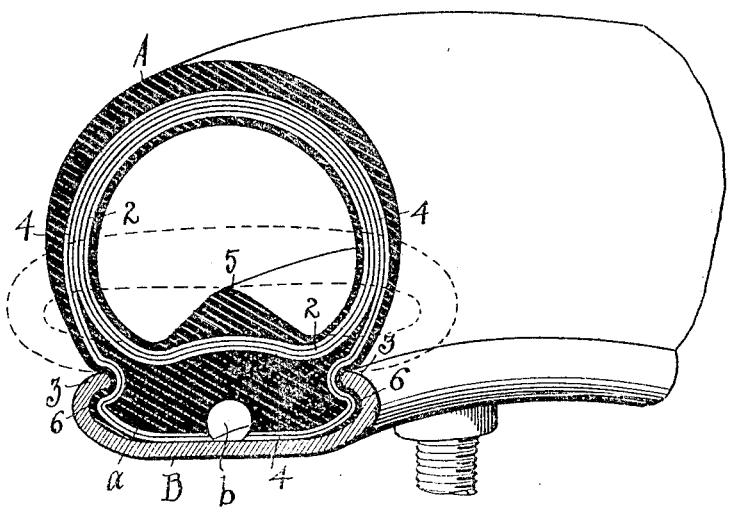

UNITED STATES PATENT OFFICE.

JAMES A. SWINEHART, OF AKRON, OHIO.

SINGLE-TUBE PNEUMATIC TIRE.

No. 909,962.     Specification of Letters Patent.     Patented Jan. 19, 1909.

Application filed February 19, 1906. Serial No. 301,788.

*To all whom it may concern:*

Be it known that I, JAMES A. SWINEHART, a citizen of the United States, residing at Akron, in the county of Summit and State of Ohio, have invented certain new and useful Improvements in Single-Tube Pneumatic Tires; and I do declare that the following is a full, clear, and exact description of the invention, which will enable others skilled in the art to which it appertains to make and use the same.

My invention relates to a single tube pneumatic tire designed to be used with a clencher rim, and which is so constructed in its base portion that rim cutting will be prevented when the tire becomes deflated while out upon the road, and that the base will be locked in the rim without cross wires or the like for holding it in place and with or without pneumatic pressure, all substantially as shown and described and particularly pointed out in the claim.

The invention is illustrated in the drawings in a single figure, showing a cross section of a portion of a tire, A, and a rim B in which the tire is engaged.

As thus shown the invention resides mainly in the base of the tire, which is original and novel in this, particularly, that said base or base portion *a* is a solid portion except the annular externally open channel *b* immediately in the bottom thereof, and is preferably of harder or stiffer rubber than the tube itself, thus making possible the fastening of the tire in the rim without cross wires or other auxiliary means, as will now appear. Thus, the said base is, first of all, a solid integral portion with the tube A, and of substantial firmness throughout, though sufficiently flexible for use with a clencher rim, and is bound in with the tube proper by means of a series of canvas or fabric layers, tubes, or reinforcements 2, which constitute the inner body portion of the tube and pass through the upper portion of the base from side to side thereof in a plane which brings them above or outside the outer rolled or inturned edges 3 of rim B, as shown in this instance. Then as an auxiliary strengthening and connecting medium I employ other reinforcements or layers of fabric 4, of canvas or its equivalent, which encircles the layers 2 and runs into the lower portion of the base of the tire around the heels or edges 6 and terminating at channel *b*. The said base is thus thoroughly incorporated with the tube proper structurally and practically, and is given such strength that it is alone able to resist the greatest strain in service without breaking loose from its engagement in the rim. This effect, however, is more or less dependent upon the pneumatic pressure from within the tube itself, and which is most advantageously exerted by reason of the peculiar construction of the top of the base which comes within the tube relatively as shown. Thus, the said upper base portion consists of a substantially $\Lambda$ shaped rib 5, in cross section having its highest point centrally as to the sides of the tube and its inclined walls or sides retreating toward the sides of the tube. The elevation and resistance of this rib or projection is designed to be such both as to height and character that it will sustain and cushion the weight which comes on a deflated tire on the road and keep the otherwise collapsed tire from being pressed down upon and cut out on the edges of the rim. The first contact of the tire or tube under such conditions will be with the apex of the $\Lambda$ shaped rib 5 as shown in dotted lines, and while there will be depression below this point as the weight of the vehicle comes thereon, the tire will ride on this rib and the rib will carry the load and the sides of the tire will be kept out of contact with the edges of the rim and prevent rim cutting of the tire. Furthermore, and as a direct means of keeping the tire on the rim without cross wires and the like the pneumatic pressure in the tire will be exerted against the sides of the said rib in such way as to crowd or spread the base laterally under the inturned edges 3 of the rim, thus locking the base securely therein. Obviously this must occur because the pressure upon the base from within necessarily is such as to crowd the heels 6 of the tire outward beneath clencher edges 3. However, if the tire becomes deflated the base *a* still has such inherent strength and rigidity by reason of its peculiar construction of base that it will remain on the rim and be serviceable for travel as above described.

What I claim is:—

As a new article of manufacture, a tubular pneumatic tire having a solid base unitary with the wall thereof and adapted to be engaged along its edges by a clencher rim, and layers of fabric built into and around the wall of the tire and through the base from side to side on different planes, and an inwardly extending solid rib at the center of said base of substantially Λ shape in cross section and unitary with the base and side of the tire.

In testimony whereof I sign this specification in the presence of two witnesses.

JAMES A. SWINEHART.

Witnesses:
C. O. BAUGHMAN,
H. F. SIEGRIST.